(12) United States Patent
Lee et al.

(10) Patent No.: US 10,946,761 B2
(45) Date of Patent: Mar. 16, 2021

(54) BATTERY MANAGEMENT DEVICE, VEHICLE HAVING THE SAME, AND METHOD FOR CONTROLLING THE VEHICLE

(71) Applicants: HYUNDAI MOTOR COMPANY, Seoul (KR); KIA MOTORS CORPORATION, Seoul (KR)

(72) Inventors: Changmin Lee, Anyang-si (KR); Young Min Yun, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 406 days.

(21) Appl. No.: 15/820,832

(22) Filed: Nov. 22, 2017

(65) Prior Publication Data

US 2019/0047437 A1 Feb. 14, 2019

(30) Foreign Application Priority Data

Aug. 11, 2017 (KR) .................. 10-2017-0101996

(51) Int. Cl.
*H02J 7/00* (2006.01)
*B60L 58/12* (2019.01)
*B60L 50/51* (2019.01)

(52) U.S. Cl.
CPC .............. *B60L 58/12* (2019.02); *B60L 50/51* (2019.02); *H02J 7/007* (2013.01); *H02J 7/0029* (2013.01); *H02J 7/0047* (2013.01)

(58) Field of Classification Search
CPC .... B60L 58/12; B60L 50/51; B60L 2240/545; B60L 2240/547; B60L 2240/549; H02J 7/007; H02J 7/0047; H02J 7/0029; B60W 10/06; B60W 10/08; B60W 10/26; B60W 20/40

See application file for complete search history.

(56) References Cited

U.S. PATENT DOCUMENTS

| | | | | |
|---|---|---|---|---|
| 3,522,481 A | * | 8/1970 | Terzic | G01R 19/16542 361/92 |
| 4,724,332 A | * | 2/1988 | Finger | H02J 7/0031 307/10.7 |
| 6,793,027 B1 | * | 9/2004 | Yamada | B60L 15/2072 180/65.1 |
| 7,324,902 B2 | * | 1/2008 | Verbrugge | G01R 31/367 702/64 |
| 2008/0074082 A1 | * | 3/2008 | Tae | B60L 58/15 320/136 |

(Continued)

*Primary Examiner* — Jared Fureman
*Assistant Examiner* — Michael J Warmflash
(74) *Attorney, Agent, or Firm* — Morgan, Lewis & Bockius LLP

(57) ABSTRACT

A battery management device for preventing a battery from being damaged by a low voltage includes a storage configured to store a first protection voltage and a second protection voltage corresponding to a protection mode of the battery; a voltage detector configured to detect a voltage of the battery; a controller configured to confirm the detected voltage, to enter the protection mode when the detected voltage of the battery is the first protection voltage, to check a time point when the detected voltage of the battery is the second protection voltage, and to release the protection mode when a predetermined time elapses from the time point.

18 Claims, 10 Drawing Sheets

(56) References Cited

U.S. PATENT DOCUMENTS

| | | | |
|---|---|---|---|
| 2012/0212176 A1* | 8/2012 | Park | B60L 58/15 |
| | | | 320/107 |
| 2014/0152261 A1* | 6/2014 | Yamauchi | G01R 31/396 |
| | | | 320/118 |
| 2014/0232324 A1* | 8/2014 | Readio | H02J 7/007 |
| | | | 320/107 |
| 2015/0219726 A1* | 8/2015 | Lenz | G01R 31/382 |
| | | | 702/63 |
| 2017/0203660 A1* | 7/2017 | He | B60L 58/14 |
| 2017/0217313 A1* | 8/2017 | Hashimoto | H02J 1/00 |
| 2017/0274775 A1* | 9/2017 | Kamata | H01M 10/486 |
| 2017/0315177 A1* | 11/2017 | Yoon | G01R 31/3835 |
| 2018/0172770 A1* | 6/2018 | Sun | H01M 2/34 |
| 2018/0198144 A1* | 7/2018 | Jin | H01M 8/0491 |
| 2018/0244265 A1* | 8/2018 | Butcher | B60W 10/08 |
| 2019/0047437 A1* | 2/2019 | Lee | H02J 7/0047 |

* cited by examiner

BATTERY MANAGEMENT DEVICE, VEHICLE HAVING THE SAME, AND METHOD FOR CONTROLLING THE VEHICLE

CROSS-REFERENCE TO RELATED APPLICATION

This application is based on and claims the benefit of priority to Korean Patent Application No. 10-2017-0101996 filed on Aug. 11, 2017 with the Korean Intellectual Property Office, the entire disclosure of which is incorporated herein by reference.

TECHNICAL FIELD

The present disclosure relates to a battery management device for preventing damage to a battery, vehicle having the same, and method for controlling the vehicle.

BACKGROUND

Vehicles are mobile machines that are driven on wheels to run on a road.

The vehicles include motor vehicles (generally engine-driven cars) that are driven with mechanical power produced by burning oil fuel, such as gasoline and diesel, and eco-friendly vehicles that are driven by electrical power to reduce amounts of harmful fuel emissions and increase fuel efficiency.

The echo-friendly vehicles include electric vehicles having a rechargeable power unit comprised of a battery and a motor, and the electric vehicles drive the wheels by rotating the motor with electricity charged in the battery. The echo-friendly vehicles also include hybrid vehicles having an engine, a battery, and a motor, and the hybrid vehicles control mechanical power of the engine and electrical power of the motor. The echo-friendly vehicles further include hydrogen fuel cell vehicles.

The hybrid vehicles are driven in an Electric Vehicle (EV) mode using motor power only, a Hybrid Electric Vehicle (HEV) mode using both engine power and the motor power, or a regenerative braking mode charging the battery by recovering braking energy from braking or inertial energy from coasting by inertia through generating operation of the motor.

However, such echo-friendly vehicles may suffer from voltage drop according to external conditions, and the voltage drop may cause damage to the battery.

SUMMARY

An aspect of the present disclosure provides a battery management device that has a protection mode and enters or releases the protection mode based on voltage of the battery, vehicle having the battery management device, and method for controlling the vehicle.

Another aspect of the present disclosure provides a battery management device that controls a protection mode to be maintained for a certain period of time based on requested power from the driver while the protection mode is performed, vehicle having the battery management device, and method for controlling the vehicle.

Another aspect of the present disclosure provides a battery management device that enters and releases a protection mode based on requested power from the driver while the protection mode is performed, vehicle having the battery management device, and method for controlling the vehicle.

In accordance with one aspect of the present disclosure, a battery management device includes: a storage configured to store a first protection voltage and a second protection voltage corresponding to a protection mode of a battery; a voltage detector configured to detect a voltage of the battery; and a controller configured to enter the protection mode if the detected battery voltage corresponds to the first protection voltage, and if the detected battery voltage corresponds to the second protection voltage, release the protection mode for a certain period of time after the detected battery voltage becomes the second protection voltage.

The storage is further configured to store factors corresponding to voltages of the battery, which are equal to or lower than the second protection voltage. The controller is further configured to determine a factor corresponding to the detected battery voltage and limit available power of the battery based on the determined factor and the detected battery voltage.

The battery management device may further include a temperature detector configured to detect temperature of the battery; and a current detector configured to detect current of the battery. The controller is further configured to determine a state of charging (SoC) of the battery based on the detected voltage and current of the battery when the protection mode is released, determine charging limitation power and discharging limitation power of the battery based on the SoC of the battery and the temperature of the battery, and control charging and discharging of the battery based on the determined charging limitation power and discharging limitation power of the battery.

The controller is further configured to determine the available power of the battery based on the factor in the storage and the discharging limitation power of the battery.

The controller is further configured to control the available power of the battery downward or control the available power of the battery to be maintained when the protection mode is performed.

The first protection voltage comprises a voltage corresponding to a minimum necessary voltage of the battery, the second protection voltage comprises a voltage corresponding to a normal voltage of the battery, and the certain period of time comprises a period of time taken for the normal voltage to be dropped to the minimum necessary voltage when an output of the battery is at the maximum.

In accordance with another aspect of the present disclosure, a vehicle includes: car wheels configured to use power from at least one of a motor and an engine as driving power; a battery configured to supply power to the motor; a battery management device configured to have a voltage detector for detecting voltage of the battery, enter a protection mode if the detected battery voltage corresponds to a first protection voltage while the vehicle is in an electric vehicle (EV) mode in which the vehicle is driven using the motor only, output available power of the battery while performing the protection mode, and if the detected battery voltage corresponds to a second protection voltage, release the protection mode for a certain period of time after the detected battery voltage becomes the second protection voltage; and a controller configured to receive available power of the battery in the protection mode of the battery and control operation of the motor based on the received battery available power.

The battery management device comprises a temperature detector configured to detect temperature of the battery; a current detector configured to detect current of the battery; a storage configured to store factors corresponding to voltages of the battery, which are equal to or lower than the second protection voltage; and a management controller configured to determine a state of charging (SoC) of the battery based on the detected voltage and current while the battery is in the protection mode, determine discharging limitation power of the battery based on the SoC of the battery and the temperature of the battery, determine a factor corresponding to the detected voltage of the battery, and determine available power of the battery based on the determined factor and the discharging limitation power of the battery.

The management controller of the battery management device is configured to determine an SoC of the battery based on the detected voltage and current when the protection mode is released, determine charging limitation power and discharging limitation power of the battery based on the SoC of the battery and the temperature of the battery, and control charging and discharging of the battery based on the determined charging limitation power and discharging limitation power of the battery.

The vehicle may further include: a pressure detector configured to detect a pressure applied onto an accelerator. The controller is further configured to obtain user request power based on the detected pressure and send the obtained user request power to the battery management device. The battery management device is configured to release the protection mode for a certain period of time after the detected voltage of the battery becomes the second protection voltage if the user request power is kept constant.

The battery management device is further configured to determine whether the user request power is maintained if the detected voltage of the battery is the second protection voltage, and release the protection mode if there is a change in the user request power.

The battery management device is further configured to keep performing the protection mode if the user request power is changed before the detected voltage of the battery reaches the second protection voltage and release the protection mode if the detected voltage of the battery is the second protection voltage while the battery is in the protection mode.

The controller is further configured to control the engine to be driven for driving the vehicle in a hybrid electric vehicle (IEV) mode if a command to enter the protection mode is received from the battery management device.

The controller is further configured to control the engine to be stopped for driving the vehicle in an electric vehicle (EV) mode if a command to release the protection mode is received from the battery management device.

The battery management device is further configured to control the available power of the battery downward or control the available power of the battery to be maintained when the protection mode is performed.

In accordance with another aspect of the present disclosure, a vehicle includes: car wheels configured to use power from at least one of a motor and an engine as driving power; a battery configured to supply power to the motor; a speed detector configured to detect a driving speed of the car wheels; a pressure detector configured to detect a pressure applied onto an accelerator; a controller configured to obtain user request power based on the detected pressure and the driving speed, and output the obtained user request power; and a battery management device configured to have a voltage detector for detecting voltage of the battery, enter a protection mode if the detected battery voltage corresponds to a first protection voltage while the vehicle is in an electric vehicle (EV) mode in which the vehicle is driven using the motor only, output available power of the battery while performing the protection mode, and if the detected battery voltage corresponds to a second protection voltage and the user request power is changed, release the protection mode. The controller is further configured to receive available power of the battery in the protection mode of the battery and control operation of the motor based on the received battery available power.

The battery management device comprises a temperature detector configured to detect temperature of the battery; a current detector configured to detect current of the battery; a storage configured to store factors corresponding to voltages of the battery, which are equal to or lower than the second protection voltage; and a management controller configured to determine a state of charging (SoC) of the battery based on the detected voltage and current while the battery is in the protection mode, determine discharging limitation power of the battery based on the SoC of the battery and the temperature of the battery, determine a factor corresponding to the detected voltage of the battery, and determine available power of the battery based on the determined factor and the discharging limitation power of the battery.

The battery management device is further configured to determine whether the user request power is maintained if the detected voltage of the battery is the second protection voltage, and release the protection mode if there is a change in the user request power.

The battery management device is further configured to keep performing the protection mode if the user request power is changed before the detected voltage of the battery reaches the second protection voltage and release the protection mode if the detected voltage of the battery is the second protection voltage while the battery is in the protection mode.

The controller is further configured to control the engine to be driven for driving the vehicle in a hybrid electric vehicle (HEV) mode if a command to enter the protection mode is received from the battery management device, and control the engine to be stopped for driving the vehicle in the EV mode if a command to release the protection mode is received from the battery management device.

In accordance with another aspect of the present disclosure, a method for controlling a vehicle driven by using a motor and an engine, the method includes steps of: detecting voltage of a battery configured to supply power to the motor if it is in an electric vehicle (EV) mode in which the vehicle is driven only by the motor; entering a protection mode of the battery if the detected voltage of the battery is a first protection voltage; driving the engine when entering the protection mode; controlling an output of the motor based on available power of the battery while the battery is in the protection mode; releasing the protection mode if the detected voltage of the battery is a second protection voltage; stopping driving of the engine when the protection mode is released; and controlling the output of the motor based on discharging limitation power of the battery.

The step of releasing the protection mode if the detected voltage of the battery is a second protection voltage comprises releasing the protection mode for a certain period of time after the detected battery voltage becomes the second protection voltage, if the detected battery voltage is the second protection voltage The step of releasing the protection mode if the detected voltage of the battery is a second protection voltage comprises determining user request power while the battery is in the protection mode, and releasing the protection mode if the detected voltage of the battery is the second protection voltage and the user request power is changed.

The method may further include steps of: detecting voltage, current, and temperature of the battery while the battery is in the protection mode; determining a state of charging (SoC) of the battery based on the detected voltage and current; determining discharging limitation power of the battery based on the SoC of the battery and the temperature of the battery; determining a factor corresponding to the detected voltage of the battery; and determining available power of the battery based on the determined factor and the discharging limitation power of the battery.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Embodiments of the present disclosure will now be described with reference to accompanying drawings.

Figure 1:
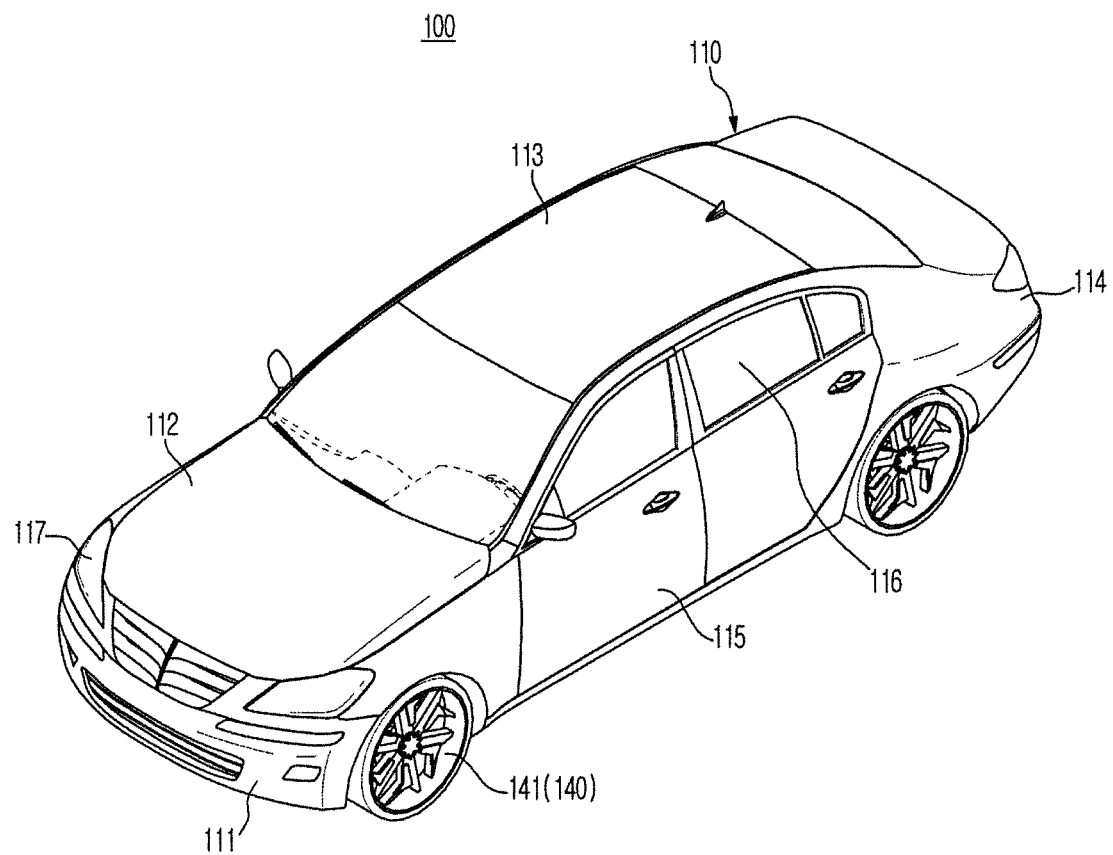
FIG. 1 illustrates an exterior of the body of a vehicle according to an embodiment of the present disclosure.
Figure 2:
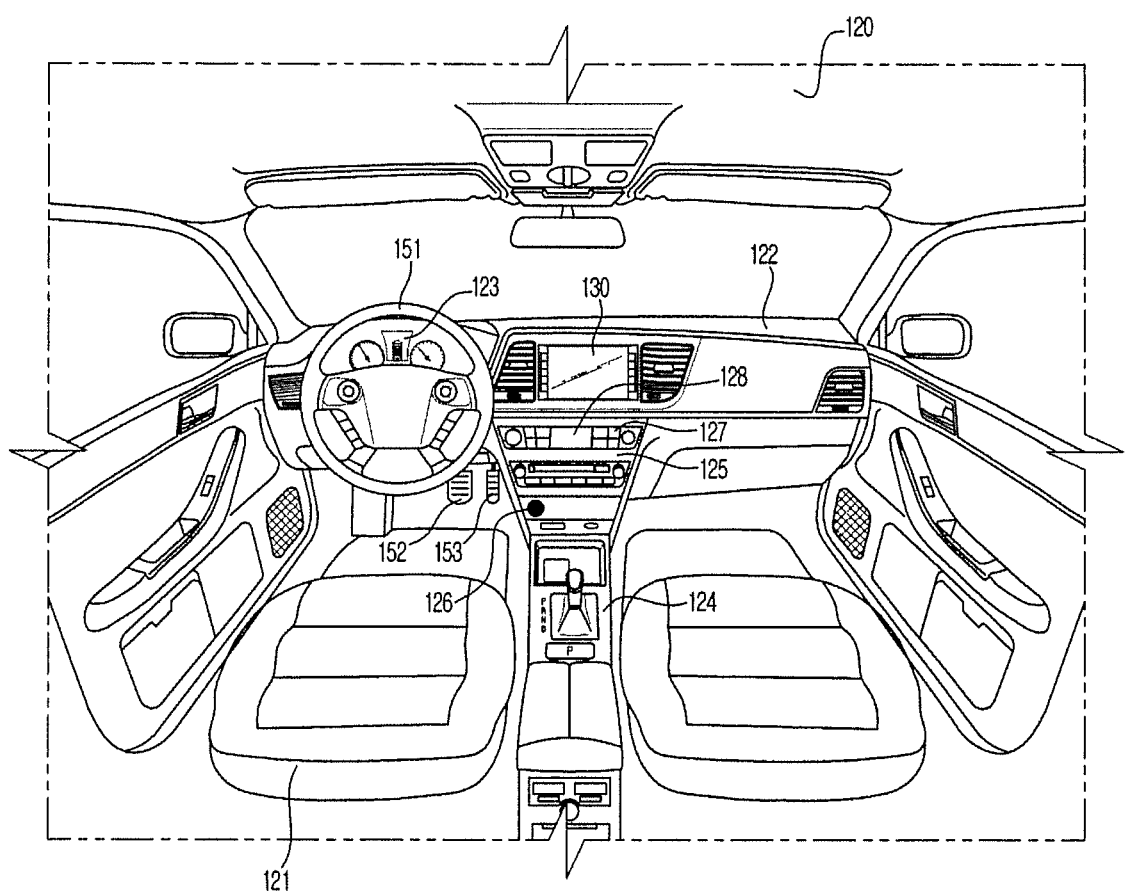
FIG. 2 illustrates an interior of the body of a vehicle according to an embodiment of the present disclosure.
Figure 3:
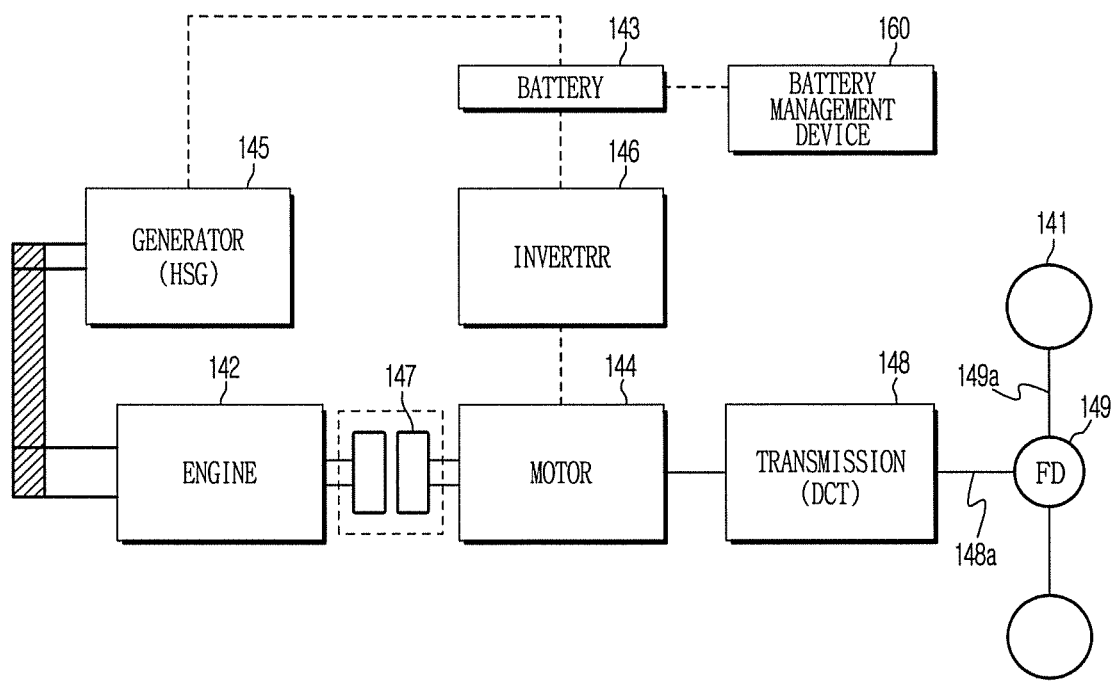
FIG. 3 illustrates a chassis of a vehicle, according to an embodiment of the present disclosure.

FIG. 1 illustrates an exterior of the body of a vehicle according to an embodiment of the present disclosure, FIG. 2 illustrates an interior of the body of a vehicle according to an embodiment of the present disclosure, and FIG. 3 illustrates a chassis of a vehicle, according to an embodiment of the present disclosure.

A vehicle 100 in an embodiment may be a hybrid vehicle driven by having an engine, a battery, and a motor and controlling mechanical power of the engine and electric power of the motor.

The vehicle 100 includes a car body with exterior and interior parts 110 and 120, and a chassis 140, which is a remaining part except the car body and on which mechanical devices required for driving are installed.

Referring to FIG. 1, the exterior part 110 of the body includes a front bumper 111, a hood 112, a roof panel 113, a rear bumper 114, front, back, left and right doors 115, and window glasses 116 equipped in the front, back, left and right doors 115 to be opened/closed.

The exterior part 110 of the body may also include fillers placed on the border between the window glasses 116 of the doors 115, side mirrors for providing views behind the vehicle 100, and lamps 117 for enabling the user to easily catch surrounding information while keeping his/her eyes forward and performing a signaling or communication function for other vehicles and pedestrians.

Referring to FIG. 2, the interior part 120 of the body includes seats 121 for people to sit thereon, a dashboard 122, an instrument panel (or cluster) 123 placed on the dashboard 122 containing gauges and indicators, such as a tachometer, speedometer, water temperature gauge, fuel gauge, turn signal indicator, head light indicator, warning light, seat belt warning light, odometer, gearshift position indicator, door open warning light, low fuel warning light, low oil pressure warning light, etc., a center fascia 124 having air vents and throttle of an air conditioner (AC) arranged thereon, a head unit 125 placed on the center fascia 124 for receiving commands to operate the AC and the audio system, and a starter 126 placed on the center fascia 124 for receiving a start command.

The vehicle 100 may further include a transmission lever placed on the center fascia 124 for receiving a manipulation position, and an electronic parking brake (EPB) button placed around the transmission lever or the head unit 125 for receiving a command to operate an EPB (not shown).

The vehicle 100 may further include an input unit 127 for receiving commands to operate various functions.

The input unit 127 may be arranged on the head unit 125 and center fascia 124, including at least one mechanical button, such as ON/OFF buttons for operation of various functions, buttons to change settings of various functions, etc.

The input unit 127 may also further include a jog dial (not shown) or a touch pad for the user to enter a command to move or select a cursor displayed on the display of a user interface 130.

The jog dial or touch pad may be arranged on the center fascia 124.

The vehicle 100 may further include a display 128 arranged in the head unit 125 for displaying information about an activated function and information input by the user.

The display 128 may display a current driving mode of the vehicle 100, which is one of an Electric Vehicle (EV) mode and a Hybrid Electric Vehicle (HEV).

The user interface 130 may be further equipped in the vehicle 100 for user convenience.

The user interface 130 may be installed by being buried in the dash board 122 or being attached to the dash board 122.

The user interface 130 may also display information about a current function being performed among audio function, video function, navigation function, Digital Multimedia Broadcasting (DMB) function, and radio function, and information input by the user.

The chassis 140 of the vehicle 100 is a frame to support the car body 110, 120, with car wheels 141 equipped at front and rear and on the left and right of the vehicle 100, power systems 142 to 149 to generate power for driving the vehicle 100 and controlling the generated power to apply the controlled power to the car wheels 141, a steering system, a braking system for applying braking power to the car wheels 141, and a suspension system.

The vehicle 100 may include a steering wheel 151 of the steering system for controlling the driving direction, a brake pedal 152 pressed by the user having intention of braking, and an accelerator pedal 153 pressed by the user having intention of acceleration (see FIG. 2).

As shown in FIG. 3, the power system may include an engine 142, a fuel system (not shown), a cooling system (not shown), a refueling system (not shown), a battery 143, a motor 144, a generator 145, an inverter 146, a clutch 147, a transmission 148, and a final reduction and differential gear 149, and further include an actuator 147a for driving the clutch 147.

The engine 142 burns oil fuel, such as gasoline and diesel to generate mechanical power, and transfers the power to the clutch 147.

The battery 143 produces power with high-tension current, and supplies the power to the motor 144, generator 145, and various kinds of electric devices in the vehicle 100.

The battery 143 is charged by receiving power supplied from the generator 145.

The battery 143 may be managed by a battery management device 160. The battery management device 160 will be described later.

The motor 144 generates turning force (also called rotational power) using electric energy from the battery 143, and delivers the turning force to the car wheels 140 to drive the car wheels 140.

Once connected to the engine 142 by the clutch 147, the motor 144 delivers turning force of the engine 142 to the car wheels 141 together with the engine 142. The motor 144 may also perform a function of absorbing a shock from closing of the clutch 147 while performing a function of the conventional torque converter.

The motor 144 may also convert the electric energy from the battery 143 to mechanical energy to operate various kinds of electric devices equipped in the vehicle 100.

The motor 144 may also operate as a generator under an energy regenerative condition due to braking, deceleration, or low-speed driving, enabling the battery 143 to be charged.

The generator 145 is a starter generator, a Hybrid Starter Generator (HSG) in particular, which may be connected to a crank shaft of the engine 142, engaged with the crank shaft of the engine 142 and may operate as a starter motor when the engine 142 is started, and may operate as a generator by the engine 142 to enable the battery 143 to be charged when the car wheels 141 are not driven by the engine 142.

In other words, the generator 145 acts as a generator by the power delivered through the engine 142, enabling the battery 143 to be charged.

The vehicle 100 may also charge the battery 143 by receiving and using power from a charger located in a parking lot or a charging place.

The power system of the vehicle 100 may further include a power converter (not shown) for converting the power generated by the generator 145 to a rechargeable power for the battery 143 and converting power from the battery 143 to driving power for the generator 145. The power converter may include a converter.

The power converter may also perform a function to change the direction and output of current between the generator 145 and the battery 143.

The inverter 146 converts the power from the battery 143 to a driving power for the motor 144.

The inverter 146 outputs the driving power for the motor 144 based on a target car speed from a user instruction. The driving power for the motor 144 may be a switching signal to output a current corresponding to the target car speed and a switching signal to output a voltage corresponding to the target car speed.

Accordingly, the inverter 146 may include a plurality of switching devices.

The clutch 147 may be arranged between the engine 142 and the motor 144.

The clutch 147 may be closed or locked when both the engine 142 and the motor 144 are used to generate driving power for the car wheels 141, and may be opened by a spring (not shown) pushed back by a fluid pressure produced by driving of an actuator, e.g., a Hydraulic Clutch Actuator (HCA) 147a, when the driving power for the car wheels 141 is generated using the motor 144 only.

That is, the clutch 147 may be opened or closed depending on a driving mode of the vehicle 100.

Specifically, the clutch 147 may be opened during slow-down or low-speed driving using the motor 144 or even when the vehicle 100 is braked, and may be closed for climbing driving, acceleration driving, and constant speed driving at more than a certain speed or even for battery protection mode.

The clutch 147 may be of a normal close type enabling the engine 142 and the motor 144 to be connected to each other when the power of the vehicle 100 is off.

The transmission 148 delivers turning motions of the engine 142 and motor 144 to the car wheels 141, or delivers a turning motion of the motor 144 to the car wheels 141.

The transmission 148 may be a dual clutch transmission (DCT) enabling two clutch based gear operation.

The transmission 148 automatically performs optimal torque conversion by enabling the gear to be automatically operated based on driving speed of the vehicle 100.

The vehicle 100 may further include the final reduction and differential gear 149 arranged between the transmission 148 and the car wheels 141.

The final reduction and differential gear 149 includes a final reduction (FD) device and a differential gear.

The FD device converts revolutions per minute (rpm) of the motor 144 for the driving speed of the vehicle 100 to reach a target speed. Specifically, the FD device generates driving power corresponding to the converted motor rpm and delivers the driving power to the left and right car wheels 141.

The FD device may also convert an input motor rpm into a certain rate.

The target speed herein used may be a speed corresponding to the pressure on the accelerator pedal 153 or brake pedal 152.

The FD device may include a drive pinion and a ring gear, reducing rotational speed and changing the rotational direction to a right angle. In other words, the FD device increases driving power and simultaneously changes the power transfer direction by reducing the speed once again between the transmission 148 and the car wheels 141.

The FD device has the drive pinion receive rotational power of a propeller shaft 148a and deliver it to the differential device by changing the rotational power into a near-right angle and reducing the speed, deliver the changed rotational power of the propeller shaft to a rear axle, and increases the rotational power through final speed reduction.

The differential gear rotates the left and right car wheels at different speeds.

Specifically, the differential gear produces driving power for each of the left and right wheels by controlling gear ratios of the transmission 148 and delivers the respective driving power to the left and right car wheels.

The power system of the vehicle in the embodiment forms a parallel structure, in which both the engine 142 and the motor 144 are connected to the axle 149a of the vehicle to drive the vehicle at the same time.

In the EV mode where the vehicle is driven only by the motor 144, the vehicle opens the clutch 147 to prevent the motor 144 and the engine 142 from being mechanically connected, thereby delivering the rotation of the motor 144 directly to the transmission 148. The engine 142 may be driven off at this time, and may be driven on when the battery is charged.

Furthermore, the vehicle 100 closes the clutch 147 when driven by operation of both the engine 142 and the motor 144 (in the HEV mode), in order for turning force of the engine 142 to be added to the turning force of the motor 144 and then delivered to the transmission 148.

Even while the vehicle 100 is driven only by the engine 142, the vehicle 100 closes the clutch 147 for the engine 142 to be rotated together with the motor 144 because the engine 142 needs to be connected to the axle 149a.

Figure 4:
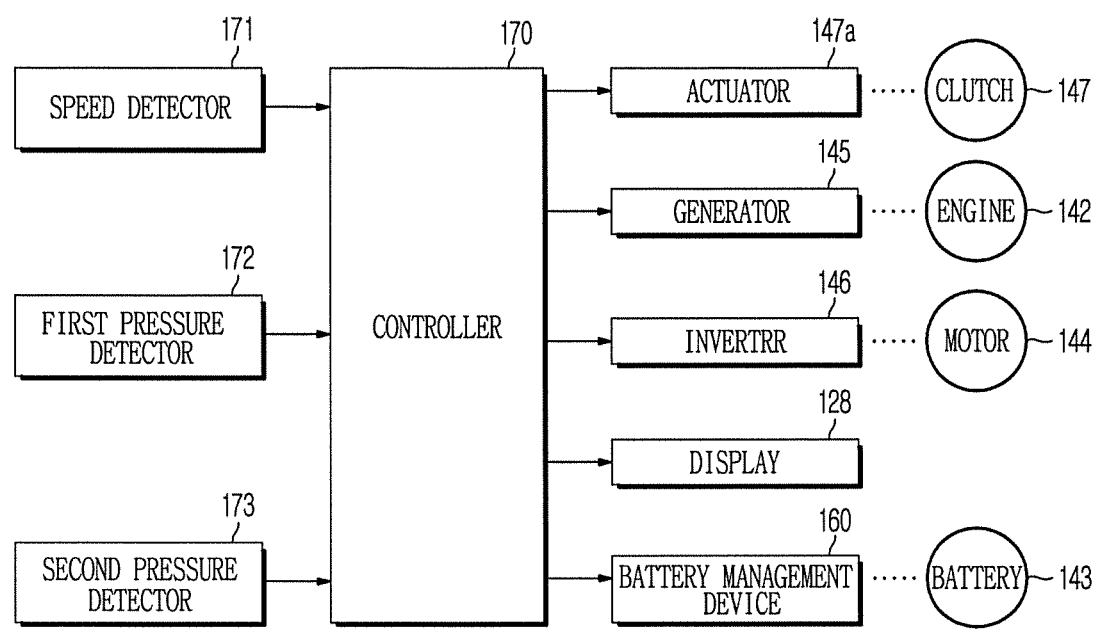
FIG. 4 is a control block diagram of a vehicle, according to an embodiment of the present disclosure.
Figure 5:
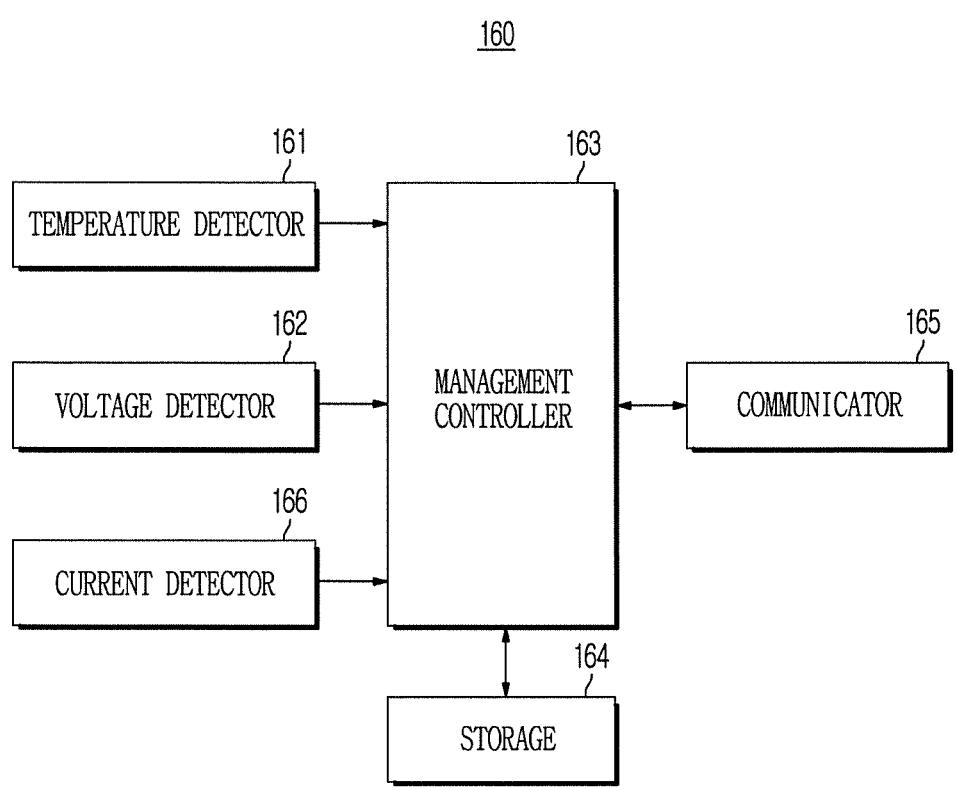
FIG. 5 is a control block diagram of a battery management device shown in FIG. 4.

FIG. 4 is a control block diagram of a vehicle, according to an embodiment of the present disclosure, and FIG. 5 is a control block diagram of the battery management device 160 shown in FIG. 4.

Referring to FIG. 4, the vehicle 100 includes the battery management device 160 for monitoring a state of charging and an abnormal state of the battery 143 and outputting the monitored result, a display 128, a speed detector 171, a first pressure detector 172, a second pressure detector 173, and a controller 170 for controlling the engine 142, the motor 144, the battery 143, the generator 145, and the clutch 147 based on status information of the battery 143 and detection information from the speed detector 171, the first pressure detector 172, and the second pressure detector 173.

The display 128 may display the EV mode using only the power of the motor 144, and the HEV mode using power of both the engine 142 and the motor 144.

The display 128 may display information about a low-voltage state of the battery 143.

The display 128 may display information about the battery protection mode entered and released.

The display 128 may be one arranged in the head unit 125, or in the cluster 123, or in the user interface.

The display 128 may be a lamp, such as a light emitting diode (LED) separately provided in the interior of the vehicle 100.

The speed detector 171 detects driving speed of the vehicle 100.

The speed detector 171 may include sensors attached onto the car wheels 141 each to detect the rotation speed of the wheel, and an acceleration detector for detecting acceleration speed of the vehicle 100.

The first pressure detector 172 detects a pressure applied to the accelerator pedal 153.

The second pressure detector 173 detects a pressure applied to the brake pedal 152.

The controller 170 is an electric circuitry that executes instructions of software which thereby performs various functions described hereinafter.

The controller 170 obtains pressure information of the accelerator pedal 153 or the brake pedal 152 when the accelerator pedal 153 or the brake pedal 152 is pressed by the user, obtains the user request power based on the obtained pressure information and speed information (i.e., vehicle speed information) detected by the speed detector 171, obtains a target driving speed for the vehicle 100 corresponding to the user request power, and controls operation of at least one of the engine 142 and the motor 144 based on the target driving speed for the vehicle 100.

Accordingly, the vehicle 100 may be driven by the power generated by the at least one of the engine 142 and the motor 144.

The controller 170 may control the vehicle 100 to perform the EV mode using the power of the motor 144 only or the HEV mode using the power of both the motor 142 and the engine 142, based on the target driving speed for the vehicle 100, whether the vehicle is accelerated, and/or whether the vehicle is climbing the hill.

The controller 170 may control closing of the clutch 147 by controlling a motor (not shown) in the actuator 147a, and control the pressure of a fluid supplied to the clutch 147 to open or close the clutch 147, thereby performing the EV mode or the HEV mode.

Assuming that the clutch 147 is of a normal close type, configuration of the controller 170 in the embodiment will now be described.

The controller 170 controls the clutch 147 to be opened when the driving mode is the EV mode, and controls the rotation speed of the motor 144 based on the target driving speed.

The controller 170 controls switching of the inverter 146 when controlling the rotation speed of the motor 144.

The controller 170 controls the clutch 147 to be closed when the driving mode corresponds to the HEV mode, and controls the rotation speed of the engine 142 and the rotation speed of the motor 144 based on the target driving speed.

When the driving mode corresponds to the HEY mode, the controller 170 controls the engine 142 to start by controlling operation of the generator 145 and controls driving of the engine 142.

The controller 170 communicates with the battery management device 160 and receives battery status information from the battery management device 160 while the vehicle 100 is driven in the HEV mode.

The battery status information may include information about entering or releasing the battery protection mode corresponding to a low-voltage state of the battery 143.

The battery status information may also include battery charging limitation power and battery discharging limitation power.

The battery status information may also include a state of charge (SoC) of the battery and battery voltage, and further include at least one of available battery power and available motor power.

The available battery power may refer to usable battery power when the user request power is constant while the battery is discharged or the user request power is predetermined reference request power.

The available motor power may refer to usable motor torque when the user request power is constant while the battery is discharged or the user request power is predetermined reference request power.

The SoC of the battery 143 may include a charging level of the battery 143.

The controller 170 may control the battery 143 to stop charging operation based on the charging limitation power received while the vehicle 100 is driven in the HEV mode, or may limit an output of the motor 144 based on the battery charging limitation power while the battery 143 is charged.

The controller 170 may determine whether to switch into the HEV mode based on the battery discharging limitation power and the target driving speed while the vehicle 100 is driven in the EV mode, and if it is determined to switch into the HEV mode, control closing of the clutch 147 equipped between the engine 142 and the motor 144 and limit the motor output based on the battery discharging limitation power while the battery 143 is discharged.

Upon reception of an instruction to enter the protection mode from the battery management device 160, the controller 170 may control driving of the motor 144 based on at least one of the available battery power and the available motor power sent from the battery management device 160, and upon reception of an instruction to release the protection mode from the battery management device 160, the controller 170 may control driving of the motor based on the SoC of the battery 143 and the target driving speed to perform the normal mode.

Once the vehicle 100 enters the battery protection mode while driven in the EV mode, the controller 170 changes the driving mode into the HEV mode and limits the motor power to the available motor power corresponding to the available battery power.

Furthermore, if the battery protection mode is released, the controller 170 changes the battery management mode to the normal mode, controls operation of the generator 145 to operate the engine 142 based on the SoC of the battery 143 and the battery temperature while the vehicle 100 is driven in the EV mode or in the HEV mode, controls the generator 145 to perform a generator function according to the operation of the engine 142 to charge the battery 143.

The controller 170 changes the clutch 147 from opened state to closed state when entering into the battery protection mode, and changes the clutch 147 from closed state to opened state when releasing the battery protection mode.

The controller 170 may also send the user request power to the battery management device 160.

When the clutch 147 is closed, the engine 142 delivers the generated power to the car wheels 141 and the generator 145.

The generator 145 starts the engine 142 based on a control command from the controller 170, or charges the battery 143 by performing the generator function according to the engine power.

The inverter 146 may convert direct current (DC) power supplied from the battery 143 to 3-phase alternate current (AC) power in response to a control command from the controller 170, and applies the AC power to the motor 144.

The actuator, HCA 147a, moves oil to the clutch 147 by driving a local motor (not shown), thereby producing a fluid pressure within the clutch 147. The fluid pressure produced within the clutch 147 pushes a spring (not shown) back in the clutch 147, which makes the clutch 147 opened.

The controller 170 may be implemented with a memory (not shown) storing an algorithm to control operation of the components in the vehicle 100 or data about a program that implements the algorithm, and a processor (not shown) carrying out the aforementioned operation using the data stored in the memory. The memory and the processor may be implemented in separate chips. Alternatively, the memory and the processor may be implemented in a single chip.

The controller 170 may include a first controller, an Engine Control Unit (ECU), for controlling operation of the generator 145 and the engine 142, a second controller, an Motor Control Unit, for controlling the inverter 146 based on a control signal from a main controller to rotate the motor 144 and perform regenerative braking at the time of braking or slowdown of the vehicle 100, a third controller, a Local Control Unit, for controlling operation of the actuator 147a to open or close the clutch 147, and the main controller, an HEV Control Unit (HCU), for distributing torque to the engine 142 and the motor 144 based on the target speed for the vehicle 100 and outputting control signals to the first, second, and third controllers based on the distributed torque.

The first, second, third, and the main controllers may be implemented separately or in an integrated single chip.

The controller 170 may be an electronic control unit (ECU) for controlling driving of the vehicle, or one of a micro controller, a central processing unit (CPU), and a processor.

Referring to FIG. 5, the battery management device 160 may include a temperature detector 161, a voltage detector 162, a management controller 163, a storage 164, and a communicator 165.

The temperature detector 161 detects a temperature of the battery 143.

The voltage detector 162 detects the voltage of the battery 143. The voltage detector 162 detects a voltage at an output of the battery 143.

The battery management device 160 may further include a current detector 166 for detecting current of the battery 143.

The management controller 163 is an electric circuitry that executes instructions of software which thereby performs various functions described hereinafter.

The management controller 163 obtains the SoC of the battery 143 based on the detected battery current and voltage, outputs the SoC of the battery 143 to the controller 170, and outputs the detected battery temperature to the controller 170.

The management controller 163 may manage the SoC based on current, voltage, and temperature of each cell of the battery 143, and control the motor output to be variable by determining charging limitation power and discharging limitation power based on the SoC of the battery and the battery temperature.

The management controller 163 may also determine the charging limitation power and the discharging limitation power of the battery 143 corresponding to the SoC of the battery 143 and the detected battery temperature based on a first table of the storage 164.

The battery charging limitation power and discharging limitation power may vary by the SoC, voltage, and temperature of the battery 143.

The management controller 163 may further prevent reduction of the life span of the battery 143 from overcharging of the battery 143 at the charging limitation power or more or from overdischarging of the battery 143 at the discharging limitation power or less.

The management controller 163 may also output the battery charging limitation power and discharging limitation power to the controller 170.

Furthermore, the management controller 163 may obtain a charging level of the battery 143 based on the SoC and the detected temperature of the battery 143.

The management controller 163 may check the voltage of the battery 143 detected while the vehicle is in the EV mode, determine if the battery 143 is in the low-voltage state based on the checked battery voltage, enter the protection mode to protect the battery 143 against damage from low-voltage if it is determined that the battery 143 is in the low-voltage state, and release the protection mode based on the battery voltage while the battery is in the protection mode and control the normal mode to be performed.

Specifically, the management controller 163 enters the protection mode if the detected battery voltage is less than a first protection voltage, and releases the protection mode if the battery voltage detected in the protection mode exceeds a second protection voltage. The management controller 163 may send a command to enter the protection mode to the controller 170 and may also send a command to release the protection mode to the controller 170.

If the battery voltage detected exceeds the second protection voltage when the user request power is constant while the battery is in the protection mode, the management controller 163 determines a point of time at which the battery voltage exceeds the second protection voltage, counts the time from the point of time, and control the protection mode to be released if the time counted has elapsed for a certain period of time.

If the user request power is reduced while the battery is in the protection mode, the management controller 163 may determine whether the detected battery voltage exceeds the second protection voltage, and control the protection mode to be released if the detected battery voltage exceeds the second protection voltage.

If the user request power is reduced while the battery is in the protection mode, the management controller 163 may determine whether the detected battery voltage exceeds the second protection voltage, and if the detected battery voltage is equal to or less than the second protection voltage, keep monitoring the battery voltage and control the protection mode to be released when the detected battery voltage exceeds the second protection voltage.

The management controller 163 determines the battery voltage while the battery is in the protection mode, determines a factor corresponding to the determined battery voltage in the second table of the storage 164, and limits the available battery power based on the determined voltage and factor.

The available battery power in the protection mode may be equal to or less than the battery discharging limitation power corresponding to the second protection voltage.

Alternatively, the available battery power in the protection mode may be equal to or less than the battery discharging limitation power before entrance into the protection mode or predetermined discharging limitation power.

The management controller 163 may enable the controller 170 to limit the motor output based on at least one of the available battery power and the available motor power by sending the at least one of the available battery power and the available motor power to the controller 170.

In controlling the available battery power in the protection mode, the management controller 163 may control the available battery power downward or maintain it before the protection mode is released. Specifically, the management controller 163 may reduce the available battery power as the battery voltage decreases while the battery is in the protection mode, but not raise but maintain the available battery power even if the battery voltage increases.

The storage 164 stores a first protection voltage to determine entrance into the protection mode, and a second protection voltage to determine release from the protection mode.

The storage 164 may store a certain period of time to maintain the protection mode.

The first and second protection voltages and the certain period of time may be determined according to preset information obtained through experiments or specifications of the battery 143. This will hereinafter be described with reference to FIG. 6.

Figure 6:
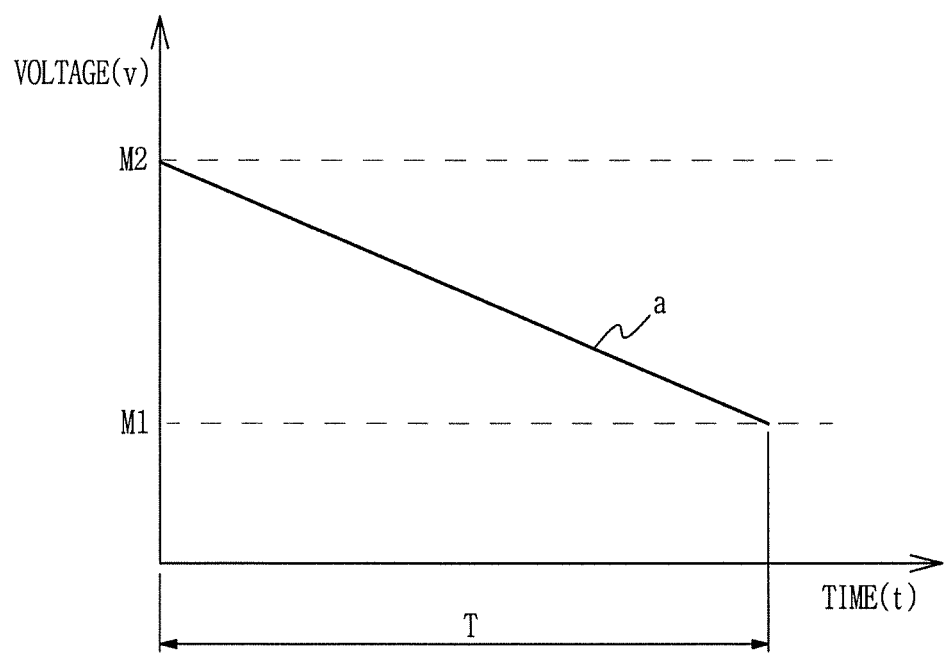
FIG. 6 illustrates setting information to perform a protection mode of a battery management device of a vehicle, according to an embodiment of the present disclosure.

Referring to FIG. 6, the first protection voltage may be a minimum necessary voltage M1 according to the battery temperature in the specification of the battery 143, or may be set with a certain margin.

The first protection voltage may be equal to or greater than the minimum necessary voltage M1 by a certain level.

The minimum necessary voltage may be a lowest voltage necessary to drive the motor.

The second protection voltage may be a normal voltage M2 according to the battery temperature in the specification of the battery 143, or may be set with a certain margin.

The second protection voltage may be equal to or smaller than the normal voltage M2 by a certain level.

The certain period of time T may be a period of time taken for the normal voltage M2 to be dropped to the minimum necessary voltage M1 when the maximum battery output (a) is used at room temperature of the battery 143. The certain period of time T may also be set with a certain margin.

In other words, the certain period of time T may be equal to or shorter than the period of time taken for the normal voltage to be dropped to the minimum necessary voltage.

Furthermore, the certain period of time may vary by the current temperature of the battery 143. The certain period of time corresponding to a battery temperature may be obtained by an experiment and stored beforehand.

The first protection voltage may be one when the battery cell voltage is about 2.7V, and the second protection voltage may be one when the battery cell voltage is about 3.2V.

The storage 164 stores the first table built in advance based on the SoC and temperature of the battery 143 in order to determine battery limitation power at a time of charging or discharging the battery 143 taking into account the SoC and temperature of the battery 143.

In other words, the first table may have matched battery charging limitation power and battery discharging limitation power corresponding to correlations of the SoC and temperature of the battery 143.

The storage 164 stores the second table having matched factors corresponding to the battery voltage in the protection mode.

The second table may be used in determining a factor to set the available motor power to be equal to or less than the battery discharging limitation power.

For example, if the battery cell discharging voltage is equal to or less than about 2.7V, the factor may be one to limit the available motor power to about 70%; if the battery cell discharging voltage is equal to or less than about 2.5V, the factor may be one to limit the available motor power to about 80%; if the battery cell discharging voltage is equal to or less than about 2.4V, the factor may be one to limit the available motor power to about 30%

The storage 164 may also store a user reference request power in the protection mode.

The storage 164 may be a memory implemented with a chip separate from the aforementioned processor in relation to the controller 170, or may be implemented integrally with the processor in a single chip.

The storage 164 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto.

The communicator 165 communicates with the controller 170 to send the battery status information to the controller 170.

The communicator 165 may include one or more components that enable communication with the controller 170, for example, at least one of a short-range communication module, wired communication module, and wireless communication module.

The short-range communication module may include various short range communication modules for transmitting and receiving signals within a short range over a wireless communication network, such as Bluetooth module, an infrared communication module, a radio frequency identification (RFID) communication module, a wireless local access network (WLAN) communication module, a near field communication (NFC) module, a Zigbee communication module, etc.

The wired communication module may include not only one of various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (WiFi) module, a wireless broadband (Wibro) module, and/or any wireless communication module for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

Figure 7:
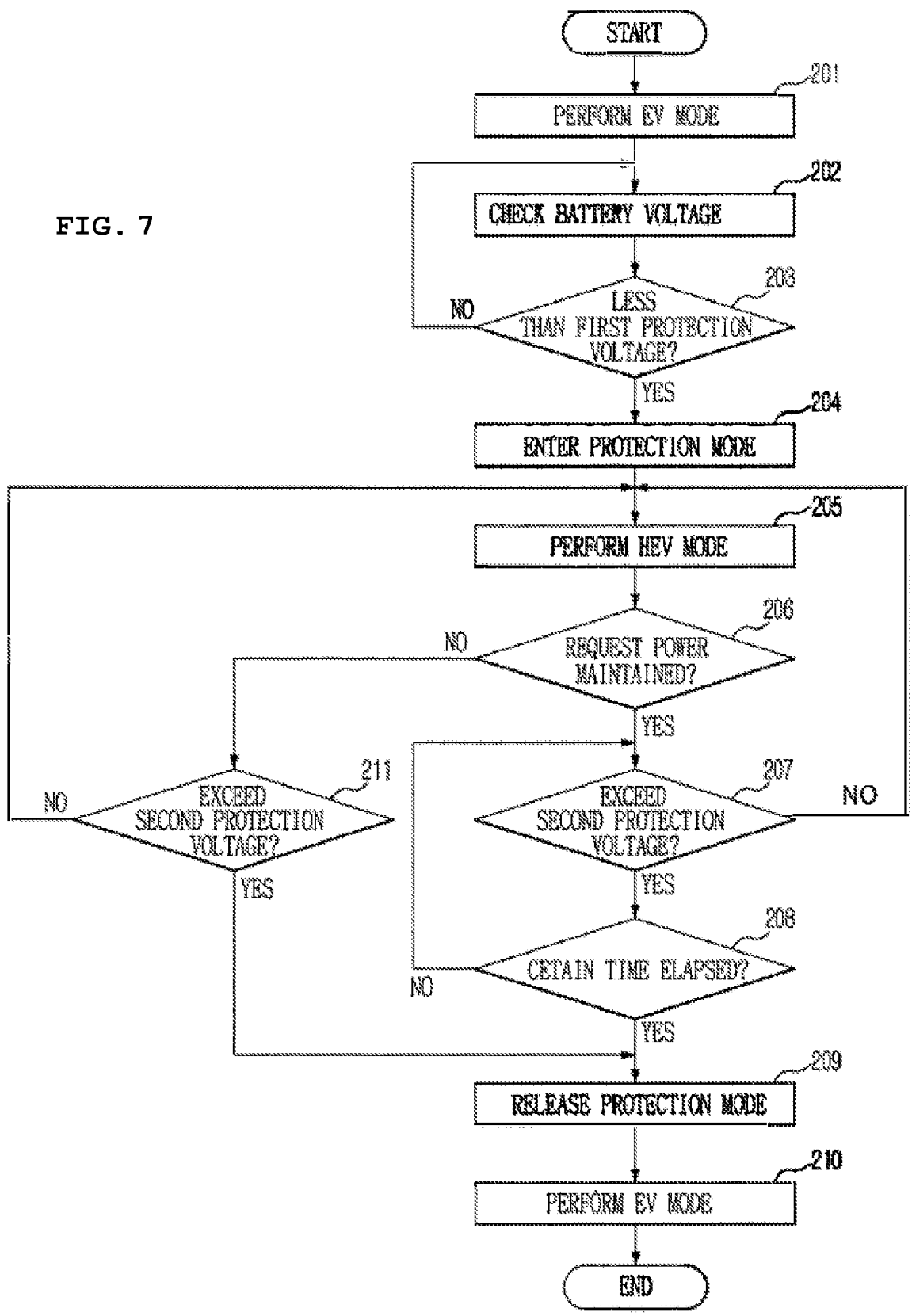
FIG. 7 is a flowchart illustrating a method for controlling a vehicle, according to an embodiment of the present disclosure.

FIG. 7 is a flowchart illustrating a method for controlling a vehicle, which will be described in connection with FIGS. 8 to 10.

Figure 8:
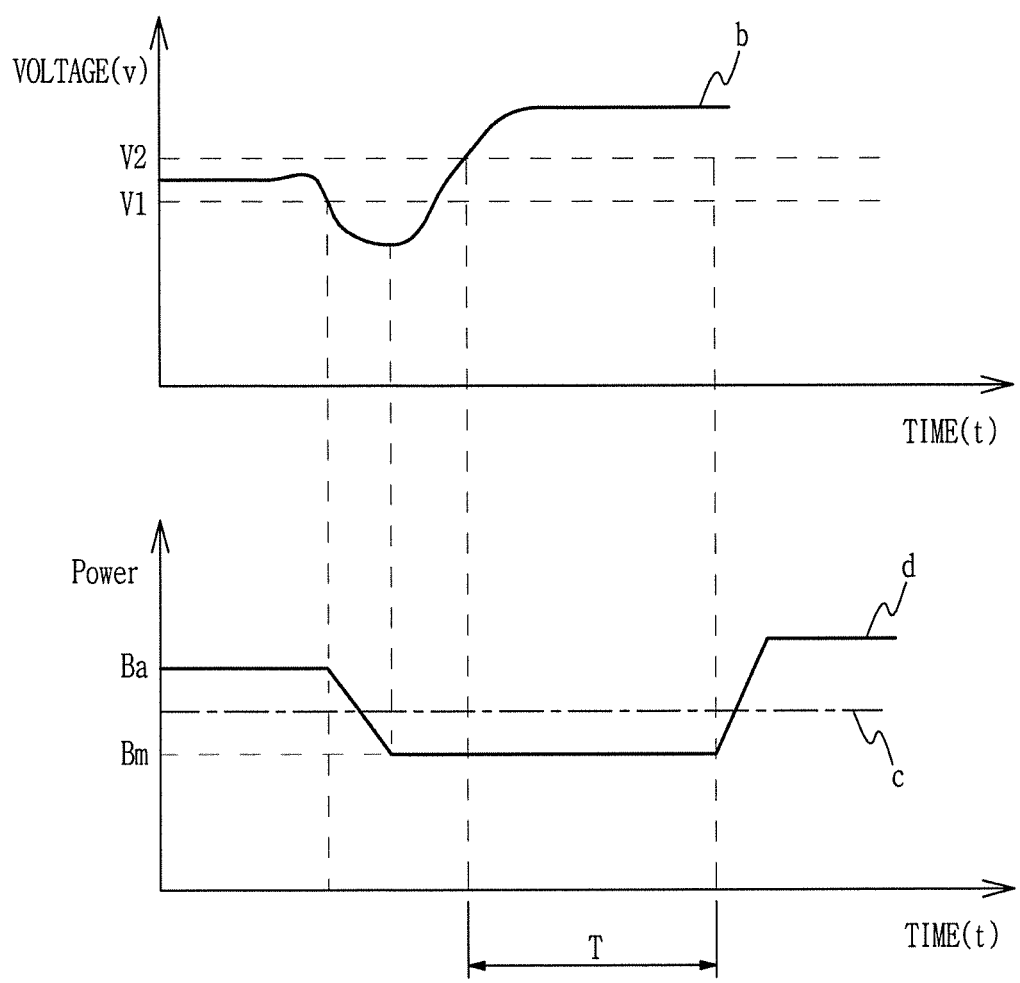
FIGS. 8 to 10 are graphs for explaining available battery power limitations corresponding to battery voltage of a battery management device of a vehicle, according to embodiments of the present disclosure.

FIG. 8 shows a graph (b) of a change in battery voltage in time, and a graph (d) of available battery power in time when the user request power is constant (c).

Figure 9:
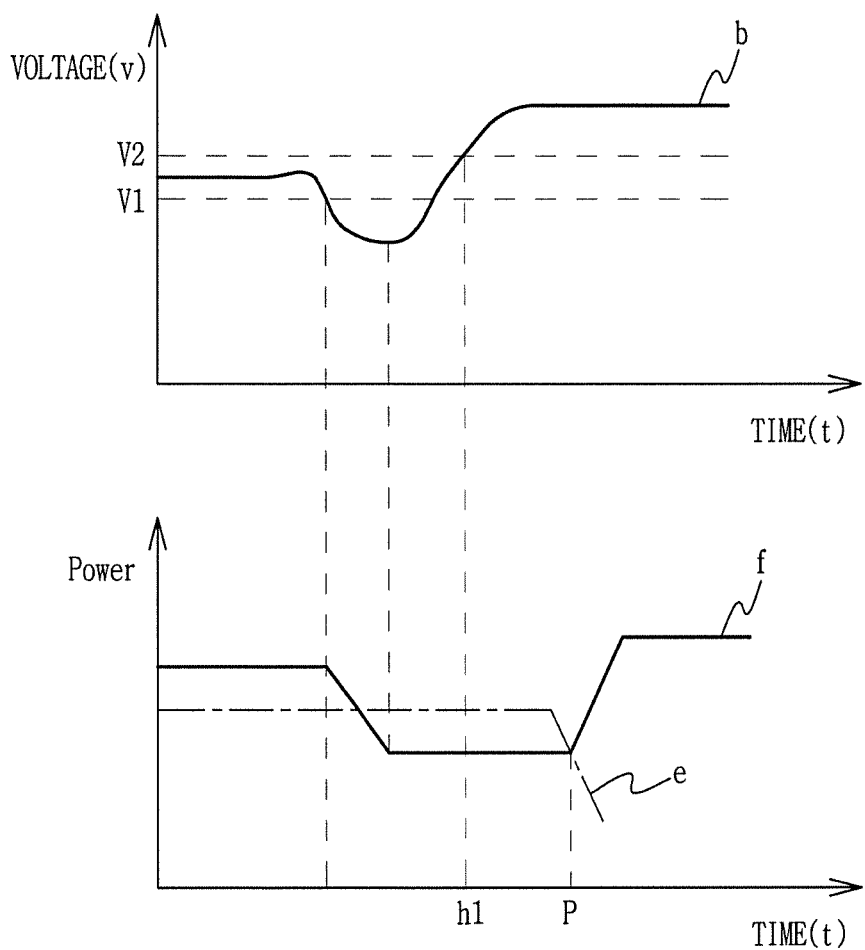

FIG. 9 shows a graph (b) of a change in battery voltage in time, and a graph (f) of available battery power in time when the user request power is changed (e) (becomes extinct or reduced).

Figure 10:
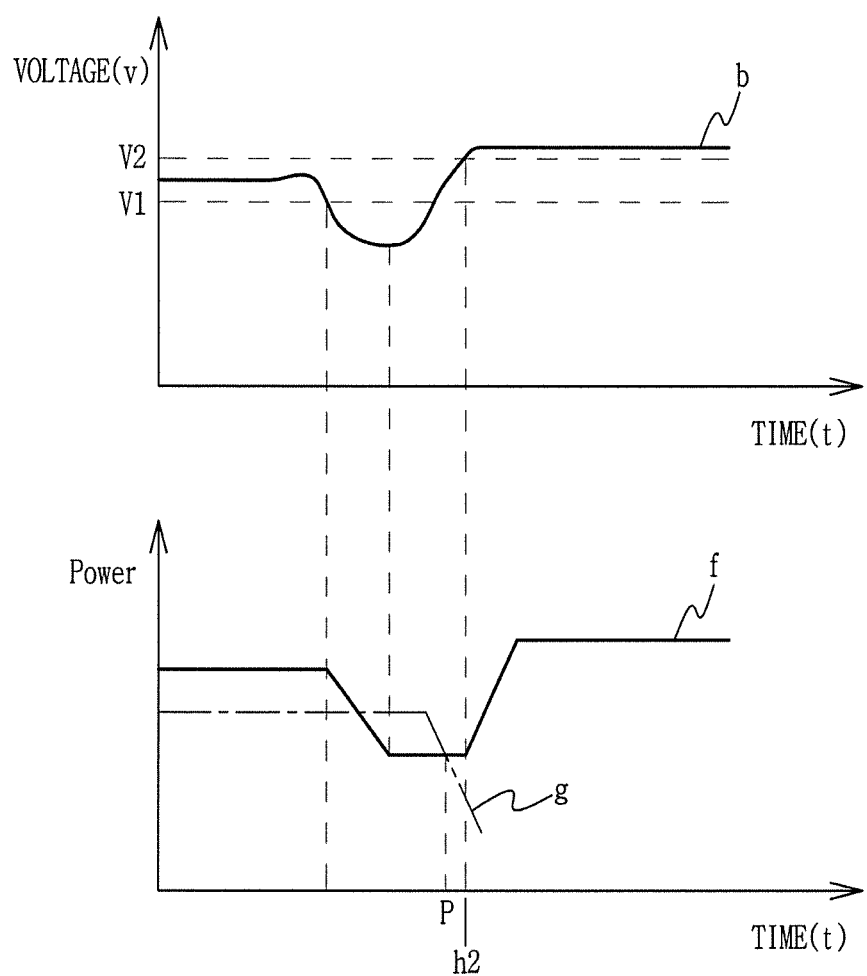

FIG. 10 shows a graph (b) of a change in battery voltage in time, and a graph (f) of available battery power in time when the user request power is changed (g) (becomes extinct or reduced).

FIGS. 9 and 10 have different extinction points of time of the user request power.

Specifically, FIG. 9 shows an occasion when the user request power becomes extinct after the battery voltage exceeds the second protection voltage, and FIG. 10 shows an occasion when the user request power becomes extinct before the battery voltage exceeds the second protection voltage.

When the button of the starter 126 is on, the vehicle 100 uses battery power to drive the motor 144 and supply the battery power to various electric devices equipped in the vehicle 100.

The vehicle 100 may also start by the engine 142 by operating the generator 145 in the winter season (i.e., when the outside temperature is dropped below a set temperature) or when the charging level of the battery 143 is less than a threshold charging level.

The vehicle 100 determines the current driving speed corresponding to a speed detected by the speed detector 171, obtains target driving speed for the vehicle 100 based on the determined driving speed and pressure applied onto the accelerator pedal 153 or the brake pedal 152, controls at least one of the clutch 147, the engine 142, and the motor 144 based on the obtained target driving speed, and is driven by the power of at least one of the engine 142 and the motor 144.

Specifically, the vehicle is driven in the HEV mode if the target speed is equal to or higher than a certain speed (i.e., if the vehicle is driven at high speed), if the vehicle is accelerated and/or if the vehicle is climbing the hill; the vehicle is driven in the EV mode if the target speed is less than the certain speed (i.e., if the vehicle is driven at low speed); the vehicle performs regenerative braking if a command to reduce speed or to brake is entered by pressing brake pedal 152.

When driven in the HEV mode, the vehicle 100 controls the clutch 147 to be closed and uses the power of the engine 142 and the motor 144 to drive the car wheels 141, and when driven in the EV mode, the vehicle 100 controls the clutch 147 to be opened and uses the power of the motor 144 only to drive the car wheels 141.

When the brake pedal 151 is pressed, the vehicle 100 may detect a fluid pressure of a master cylinder (not shown) with a pressure sensor, calculate a target braking power based on the detected fluid pressure, determine a rotational power corresponding to part of the target braking power, and perform regenerative braking based on the determined rotational power.

The target braking power may be produced by the regenerative braking and the braking system. At this time, the motor 144 serves as a generator causing the battery 143 to be charged.

When stopped, the vehicle 100 stops operation of the motor 144 and the engine 142.

The vehicle switches between the HEV mode and the EV mode based on the target speed, and/or whether the vehicle is accelerated and/or climbing the hill.

The vehicle 100 detects voltage, current and temperature of the battery 143 while the vehicle is in the EV mode, obtains the SoC of the battery based on the detected voltage and current, determines battery charging limitation power and discharging limitation power corresponding to the SoC and temperature of the battery 143 through the first table stored in the storage 164 of the battery management device 160, and controls the motor output based on the determined battery discharging limitation power.

The vehicle 100 may also control the motor output based on the determined battery charging limitation power while driven in the HEV mode.

The vehicle 100 checks the battery voltage detected by the voltage detector 162 in 202 while the vehicle is in the EV mode in 201, determines if the battery voltage is less than the first protection voltage V1 in 203, and enters the battery protection mode in 204 if it is determined that the battery voltage is less than the first protection voltage.

The vehicle 100 performs the HEV mode in 205 when entering the protection mode, closes (i.e., couples) the clutch 147 while performing the HEV mode, starts the engine 142 using the generator 145, and controls rotation of the engine 142 based on a target driving speed when the engine start is completed.

As shown in FIG. 8, when the vehicle 100 enters the protection mode and then switches to the HEV mode, the battery voltage (a) in the beginning of the entrance into the protection mode may be between the first and second protection voltages or lower than the first protection voltage.

The vehicle 100 determines battery discharging limitation power corresponding to the SoC and temperature of the battery 143 through the first table while performing the protection mode, determines a factor in the second table corresponding to the battery voltage, and determines available battery power based on the determined factor and discharging limitation power.

The vehicle 100 then limits the battery output based on the determined available battery power, and limits the available motor power based on the determined available battery power. With the operations, the vehicle 100 may control an output of the engine 142 based on the output limitations of the motor 144 while performing the HEV mode.

The vehicle 100 may perform variable control on the available battery power based on the detected battery voltage, and in the variable control on the available battery power, limit the available battery power (d) to discharging limitation power (Ba) or less corresponding to the second protection voltage.

In the variable control on the available battery power, the vehicle 100 may limit the available battery power to discharging limitation power (Bm) corresponding to the minimum necessary voltage of the battery 143, or to discharging limitation power corresponding to the first protection voltage, or to a preset available power.

The vehicle 100 operates the generator 145 to perform a generator function according to the operation of the engine 142, thereby allowing the battery 143 to be charged.

As such, as the vehicle is driven in the HEV mode while performing the protection mode, the battery voltage may increase by the generator function of the generator 145.

The vehicle 100 determines driving speed of the vehicle 100 based on a speed detected by the speed detector 171 while driven in the HEV mode, obtains target driving speed based on the pressure detected by one of the first and second pressure detectors 172 and 173 and the driving speed, and determines whether the user request power is maintained based on the obtained target driving speed, in 206.

As shown in FIG. 8, if it is determined that the user request power (c) is maintained, the vehicle 100 determines voltage of the battery 143 detected by the voltage detector 162 and determines if the determined battery voltage exceeds the second protection voltage, in 207.

If it is determined that the determined battery voltage exceeds the second protection voltage, the vehicle 100 determines a point of time at which the determined battery voltage exceeds the second protection voltage, counts the time from the determined point, and determines whether the time counted has elapsed the certain period of time T, in 208.

If it is determined that the time counted has elapsed the certain period of time T, the vehicle 100 releases the protection mode in 209 and performs the EV mode, in 210. The vehicle 100 may be driven using the motor power by opening the clutch 147 while the vehicle is in the EV mode.

As described above, the vehicle 100 in the embodiment may charge the battery 143 for a certain period of time longer even if the battery voltage is higher than the second protection voltage, thereby making the battery voltage reach a stable range.

Furthermore, the vehicle 100 checks the battery voltage detected by the voltage detector 162 while the vehicle is in the EV mode, determines the available battery power corresponding to the battery voltage, temperature, and SoC, and controls the motor output based on the determined available battery power.

When the protection mode is released, the available battery power may be the battery discharging limitation power.

If it is determined that the user request power is not maintained in 206, the vehicle 100 checks the battery voltage detected by the voltage detector 162, determines whether the battery voltage exceeds the second protection voltage, in 211, and releases the protection mode at the user request power becomes extinct if it is determined that the battery voltage exceeds the second protection voltage.

As shown in FIG. 9, the vehicle 100 determines if the user request power is maintained while controlling the available battery power to be limited (f) based on the battery voltage during the protection mode, and releases the protection mode and enters the EV mode at a point of time (P) when the user request power becomes extinct if it is determined that the battery voltage exceeds the second protection voltage while the user request voltage is not maintained.

Furthermore, the vehicle 100 determines if the user request power is maintained while controlling the available battery power to be limited (f) based on the battery voltage, determines a point of time (h1) when the battery voltage exceeds the second protection voltage if the battery voltage exceeds the second protection voltage while the user request power is maintained, and counts the time from the point (h1) and may release the protection mode if the user request power becomes distinct (e) before the time counted elapses a certain period of time.

That is, the vehicle 100 may release the protection mode as soon as the user request power becomes extinct (e) at the point (P) after the point of time (h) when the battery voltage exceeds the second protection voltage.

Furthermore, the vehicle 100 checks the battery voltage detected by the voltage detector 162, determines the available battery power corresponding to the battery voltage, temperature, and SoC, and controls the motor output based on the determined available battery power.

The vehicle 100 monitors the battery voltage detected by the voltage detector 162 periodically if it is determined that the battery voltage is equal to or lower than the second protection voltage while the user request power is not maintained, and releases the protection mode if determining that the monitored battery voltage exceeds the second protection voltage.

As shown in FIG. 10, the vehicle 100 determines whether the user request power is maintained while controlling the available battery power to be limited (f) based on the battery voltage during the protection mode, determines the battery voltage at a point of time (P) when the user request power becomes extinct if the user request power is not maintained, determines the battery voltage periodically if the battery voltage at the extinction point (P) is equal to or lower than the second protection voltage, and releases the protection mode at a point of time (h2) when the battery voltage exceeds the second protection voltage.

Furthermore, the vehicle checks the battery voltage detected by the voltage detector 162, determines the available battery power corresponding to the battery voltage, temperature, and SoC, and controls the motor output based on the determined available battery power.

According to the present disclosure, a protection mode is set to prevent voltage drop of a battery from an external condition while a large amount of battery is continuously consumed and accordingly, to prevent damage to the battery due to the voltage drop or limited battery output.

Since the present disclosure may prevent damage to the battery from low battery voltage, salability of motor-driven Hybrid Electric Vehicle (HEV) or Plug-in Hybrid Electric Vehicle (PHEV) may be increased, which leads to an increase of user satisfaction and ensures competitiveness of the product.

Furthermore, the present disclosure may enhance a repetitive clutch engagement/disengagement phenomenon while the vehicle is driven by the motor.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A battery management device comprising:
   a storage configured to store a first protection voltage and a second protection voltage corresponding to a protection mode of a battery, the first protection voltage including a voltage corresponding to a minimum necessary voltage of the battery required to drive a motor, the second protection voltage being higher than the first protection voltage;
   a voltage detector configured to detect a voltage of the battery; and
   a controller configured to:
      enter the protection mode when the detected battery voltage is less than or equal to the first protection voltage, and
      release the protection mode when the detected battery voltage exceeds the second protection voltage and a certain period of time has elapsed after the detected battery voltage exceeded the second protection voltage,
   wherein the certain period of time includes a period of time for which a voltage of the battery is dropped from the second protection voltage to the first protection voltage at a maximum output of the battery.

2. The battery management device of claim 1, wherein the storage is further configured to store factors corresponding to voltages of the battery, which are equal to or lower than the second protection voltage, and
   wherein the controller is further configured to determine a factor corresponding to the detected battery voltage and limit available power of the battery based on the determined factor and the detected battery voltage.

3. The battery management device of claim 2, further comprising:
   a temperature detector configured to detect temperature of the battery; and
   a current detector configured to detect current of the battery,
   wherein the controller is further configured to:
      determine a state of charging (SoC) of the battery based on the detected voltage and current of the battery when the protection mode is released,
      determine charging limitation power and discharging limitation power of the battery based on the Soc of the battery and the temperature of the battery, and
      control charging and discharging of the battery based on the determined charging limitation power and discharging limitation power of the battery.

4. The battery management device of claim 3, wherein the controller is further configured to determine the available power of the battery based on the factor in the storage and the discharging limitation power of the battery.

5. The battery management device of claim 2, wherein the controller is further configured to control the available power of the battery downward or control the available power of the battery to be maintained when the protection mode is performed.

6. The battery management device of claim 1, wherein the second protection voltage comprises a voltage corresponding to a normal voltage of the battery.

7. A vehicle comprising:
   car wheels configured to use power from at least one of a motor and an engine as driving power;
   a battery configured to supply power to the motor;
   a battery management device configured to:
      have a voltage detector for detecting voltage of the battery,
      enter a protection mode when the detected battery voltage is less than or equal to a first protection voltage while the vehicle is in an electric vehicle (EV) mode in which the vehicle is driven using the motor only, the first protection voltage including a voltage corresponding to a minimum necessary voltage of the battery required to drive the motor,
      output available power of the battery while performing the protection mode, and
      release the protection mode when the detected battery voltage exceeds a second protection voltage, which is higher than the first protection voltage, and a certain period of time has elapsed after the detected battery voltage exceeded the second protection voltage; and
   a controller configured to receive available power of the battery in the protection mode of the battery and control operation of the motor based on the received battery available power,
   wherein the certain period of time includes a period of time for which a voltage of the battery is dropped from the second protection voltage to the first protection voltage at a maximum output of the battery.

8. The vehicle of claim 7, wherein the battery management device comprises:
   a temperature detector configured to detect temperature of the battery;
   a current detector configured to detect current of the battery;
   a storage configured to store factors corresponding to voltages of the battery, which are equal to or lower than the second protection voltage; and
   a management controller configured to:
      determine a state of charging (SoC) of the battery based on the detected voltage and current while the battery is in the protection mode,
      determine discharging limitation power of the battery based on the SoC of the battery and the temperature of the battery,
      determine a factor corresponding to the detected voltage of the battery, and
      determine available power of the battery based on the determined factor and the discharging limitation power of the battery.

9. The vehicle of claim 8, wherein the management controller of the battery management device is further configured to:
   determine an SoC of the battery based on the detected voltage and current when the protection mode is released,
   determine charging limitation power and discharging limitation power of the battery based on the SoC of the battery and the temperature of the battery, and control charging and discharging of the battery based on the determined charging limitation power and discharging limitation power of the battery.

10. The vehicle of claim 7, further comprising a pressure detector configured to detect a pressure applied onto an accelerator,
   wherein the controller is further configured to obtain user request power based on the detected pressure and send the obtained user request power to the battery management device, and
   wherein the battery management device is further configured to release the protection mode when the certain period of time has elapsed after the detected voltage of the battery exceeded the second protection voltage and the user request power is kept constant.

11. The vehicle of claim 10, wherein the battery management device is further configured to determine whether the user request power is maintained when the detected voltage of the battery exceeds the second protection voltage, and release the protection mode when there is a change in the user request power.

12. The vehicle of claim 10, wherein the battery management device is further configured to keep performing the protection mode when the user request power is changed before the detected voltage of the battery reaches the second protection voltage, and release the protection mode when the detected voltage of the battery is the second protection voltage while the battery is in the protection mode.

13. The vehicle of claim 7, wherein the controller is further configured to control the engine to be driven for driving the vehicle in a hybrid electric vehicle (HEV) mode when a command to enter the protection mode is received from the battery management device.

14. The vehicle of claim 7, wherein the controller is further configured to control the engine to be stopped for driving the vehicle in an electric vehicle (EV) mode when a command to release the protection mode is received from the battery management device.

15. The vehicle of claim 7, wherein the battery management device is further configured to control the available power of the battery downward or control the available power of the battery to be maintained when the protection mode is performed.

16. A method for controlling a vehicle driven by using a motor and an engine, the method comprising steps of:
   detecting voltage of a battery configured to supply power to the motor while the vehicle is in an electric vehicle (EV) mode in which the vehicle is driven only by the motor;
   entering a protection mode of the battery when the detected voltage of the battery is less than or equal to a first protection voltage, the first protection voltage including a voltage corresponding to a minimum necessary voltage of the battery required to drive the motor;
   driving the engine when entering the protection mode;
   controlling an output of the motor based on available power of the battery while the battery is in the protection mode;
   releasing the protection mode when the detected voltage of the battery exceeds a second protection voltage, which is higher than the first protection voltage, and a certain period of time has elapsed after the detected battery voltage exceeded the second protection voltage;
   stopping driving of the engine when the protection mode is released; and
   controlling the output of the motor based on discharging limitation power of the battery,
   wherein the certain period of time includes a period of time for which a voltage of the battery is dropped from the second protection voltage to the first protection voltage at a maximum output of the battery.

17. The method of claim 16, wherein the step of releasing the protection mode comprises
   determining user request power while the battery is in the protection mode, and releasing the protection mode when the detected voltage of the battery exceeds the second protection voltage and the user request power is changed.

18. The method of claim 16, further comprising steps of:
   detecting voltage, current, and temperature of the battery while the battery is in the protection mode;
   determining a state of charging (SoC) of the battery based on the detected voltage and current;
   determining discharging limitation power of the battery based on the SoC of the battery and the temperature of the battery;
   determining a factor corresponding to the detected voltage of the battery; and
   determining available power of the battery based on the determined factor and the discharging limitation power of the battery.

* * * * *